Patented Nov. 2, 1948

2,453,103

UNITED STATES PATENT OFFICE 2,453,103

DECARBOXYLATION OF 3,4-DIHYDROXY-2,5-DICARBOXYTHIOPHENE

Stockton Graeme Turnbull, Jr., Wilmington, Del., assignor to E. I. du Pont de Nemours & Company, Wilmington, Del., a corporation of Delaware No Drawing. Application February 25, 1944,
Serial No. 523,915

2 Claims. (Cl. 260—329)

This invention pertains to new and useful derivatives of thiophene and more particularly refers to compounds of the following general formula:

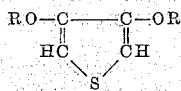

wherein R represents hydrogen, a hydrocarbon radical or an acyl group; and processes for the production of these compounds.

Heretofore, attempts have been made to produce compounds somewhat similar to the foregoing, but without success. For example, Hinsberg, Berichte 45 2413 (1912) attempted to obtain 3,4-dihydroxythiophene by the simultaneous saponification and decarboxylation of 3,4-dihydroxy-2,5-dicarbomethoxythiophene. This attempt was, however, a total failure and none of the desired compound was obtained.

It is an object of this invention to produce new derivatives of thiophene which are particularly adapted for use as pharmaceutical intermediates. A further object is to produce these compounds by simple and efficient processes. Additional objects will become apparent from a consideration of the following description and claims.

These objects are attained in accordance with the present invention wherein compounds conforming to the following general formula are produced:

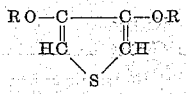

wherein R represents hydrogen, a hydrocarbon radical or an acyl group. In a more restricted sense this invention is directed to compounds such as the 3,4-dihydroxythiophene, the 3,4-dihydroxythiophene-dibenzoate, and the 3,4-dimethoxythiophene. Another embodiment of this invention is concerned with processes for the production of the foregoing compounds, whereby 3,4-dihydroxy-2,5-dicarboxythiophene and its ethers and esters are decarboxylated. In another embodiment this invention is concerned with products produced by the etherification or esterification of 3,4-dihydroxythiophene.

The invention may be more readily understood by a consideration of the following illustrative examples wherein the quantities are stated in parts by weight:

EXAMPLE 1

3,4-dihydroxythiophene

Five parts of 3,4-dihydroxy-2,5-dicarboxythiophene was warmed in 50 cc. of gently refluxing anhydrous pyridine for several minutes until test of the exit gases with $Ba(OH)_2$ solution indicated no more carbon dioxide to be evolved. The clear solution was then poured into a separatory funnel containing a cold solution of 103 parts of conc. HCl in 500 parts of water saturated with sulfur dioxide. The mixture was quickly extracted twice with 400-part portions of ether, which on drying and concentration gave 4.1 parts of white crystals and oil. On warming in benzene 1.4 parts of light yellow needles that melted at 88–90° C. were obtained. Recrystallization from a benzene-ethyl acetate mixture containing dissolved sulfur dioxide gave an analytical sample of 3,4-dihydroxythiophene that melted at 90–91.5° C.

Calc. for $C_4H_4O_2S$: C, 41.40; H, 3.45; found: C, 41.65; H, 3.27.

This product is very soluble in methanol and acetone, and quite soluble in water and acetic acid. It can be recrystallized from benzene, ethyl acetate or chloroform, but is insoluble in petroleum ether. The purified product is apparently quite stable, but impure samples darken rapidly on heating or on exposure to air.

3,4-dihydroxy-2,5-dicarboxylic acid was also decarboxylated by warming in water above 90° C. The decarboxylated product remains in solution upon cooling.

EXAMPLE 2

3,4-dihydroxythiophene dibenzoate

Five parts of 3,4-dihydroxythiophene-2,5-dicarboxylic acid was warmed under gentle reflux in 50 cc. of dry pyridine until no more carbon dioxide was evolved. Without isolation of the 3,4-dihydroxythiophene thus produced, its dibenzoate was obtained by cooling the pyridine solution and treating with 15 parts of benzoyl chloride. After 20 hours at room temperature the solution was poured into 500 parts of water. The oily dibenzoate soon crystallized and was recrystallized from methanol to obtain 6.5 parts of the pure material which melted at 108–110° C.

Calc. for $C_{18}H_{12}O_4S$: C, 66.62; H, 3.73; S, 9.86; found: C, 66.39; H, 3.77; S. 9.97.

EXAMPLE 3

3,4-dihydroxythiophene diacetate

A pyridine solution of 3,4-dihydroxythiophene was prepared by decarboxylation of the dicarboxylic acid, and was then acetylated at room temperature with acetic anhydride. The diacetate thus prepared was obtained as an oil which was caustic-insoluble, but could not be induced to crystallize.

EXAMPLE 4

*3,4-dimethoxythiophene*

To 3.78 parts of diazomethane in 100 parts of cold absolute ether there was added 3.48 parts of 3,4-dihydroxythiophene. Nitrogen was evolved and a small amount of resinous tar was formed. After standing over night at 5° C., the excess diazomethane was decomposed with dilute hydrochloric acid, the ether solution was washed with dilute caustic, and on drying and concentration gave 3.8 parts of a yellow oil. This was distilled under nitrogen to obtain 3.0 parts (70% of theory) of a straw-colored oil that distilled at 100–101.5° C. at 10–11 mm.

Calc. for $C_6H_8O_2S$: C, 50.00; H, 5.55; found: C, 50.10; H, 5.45.

The dimethoxythiophene was also prepared by decarboxylation of 3,4-dimethoxy-2,5-dicarboxythiophene as follows: To 200 parts of redistilled quinoline heated under nitrogen to 175° C. there was added 10 parts of the dimethoxythiophenedicarboxylic acid and 2.0 parts of Gattermann copper powder [Ber. 23 1219 (1890)]. The mixture was heated under nitrogen at 180–185° C. for 12 minutes. The cooled mixture was diluted with ether, filtered from copper and extracted repeatedly with dilute hydrochloric acid until no more quinoline was present. After several washes of the ether extract with dilute caustic to remove any unchanged acids (0.3 part), the ethereal layer was dried and concentrated to yield 6.1 parts of oil which distilled at 122° C. at 22 mm.

In its physical properties this dimethyl ether is similar to veratrol, the dimethyl ether of catechol. It is soluble in acetone, methanol and hexane and crystallizes from the latter on cooling in an alcohol-carbon dioxide bath.

It is to be understood that the foregoing examples are representative merely of a few of the many embodiments of this invention. They may be varied widely with respect to the individual reactants, the amounts thereof and the conditions of reaction without departing from the scope hereof.

As previously mentioned, the compounds of this invention conform to the following general formula:

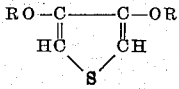

wherein R represents hydrogen, an acyl group or a hydrocarbon radical such as an alkyl group, an aryl group or an aralkyl group. It is to be understood that in place of the groups referred to in the examples these groups may be any of the others embraced within the foregoing categories. Likewise, it is to be understood that while both groups represented by R are generally the same, it is contemplated that they may be dissimilar.

The foregoing compounds are prepared by decarboxylation of compounds conforming to the following general formula:

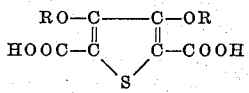

wherein R has the same meaning as heretofore stated.

These compounds may also be prepared by the etherification or esterification of 3,4-dihydroxythiophene.

The compounds of the present invention are particularly adapted for use as intermediates in the preparation of pharmaceuticals, especially vitamins. It is also contemplated that they may be used for numerous other purposes in the industrial arts, such as photographic developers, dye intermediates, metal deactivators, and intermediates for the manufacture of synthetic fibres, etc.

Several other useful classes of thiophene derivatives are described and claimed in copending applications Serial Nos. 523,913, now abandoned, 523,914, and 523,916, now Patent 2,442,027.

As many apparently widely different embodiments of this invention may be made without departing from the spirit and scope hereof, it is to be understood that the invention is not limited to the specific embodiments hereof except as defined in the appended claims.

I claim:

1. A process which comprises reacting 3,4-dihydroxy-2,5-dicarboxythiophene with anhydrous pyridine.

2. A process which comprises reacting 3,4-dihydroxy-2,5-dicarboxythiophene with an anhydrous heterocyclic amine selected from the group consisting of pyridine and quinoline.

STOCKTON GRAEME TURNBULL, Jr.

REFERENCES CITED

The following references are of record in the file of this patent:

UNITED STATES PATENTS

| Number | Name | Date |
|---|---|---|
| 1,977,048 | De Grote | Oct. 16, 1934 |
| 2,085,065 | Andersen | June 29, 1937 |
| 2,157,796 | Muth | May 9, 1939 |

OTHER REFERENCES

Hinsberg: Berichte 45 (1912), pages 2413–18. (Copy in 260—327.)

Chem. Abs. 36 (1936), page 481.

Alles: J. Pharm. & Exp. Ther. 72 No. 3 (July 1941), pages 265–275. (Copy in 260—345.)